US012792518B2

(12) United States Patent
Estep et al.

(10) Patent No.: US 12,792,518 B2
(45) Date of Patent: Nov. 10, 2026

(54) MEMORY SUB-SYSTEM AWARE PREFETCHING IN A DISAGGREGATED MEMORY ENVIRONMENT

(71) Applicant: Micron Technology, Inc., Boise, ID (US)

(72) Inventors: Patrick Estep, Rowlett, TX (US); David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/097,030

(22) Filed: Apr. 1, 2025

(65) Prior Publication Data

US 2025/0315379 A1 Oct. 9, 2025

Related U.S. Application Data

(60) Provisional application No. 63/574,839, filed on Apr. 4, 2024.

(51) Int. Cl.

| | |
|---|---|
| ***G06F 12/0862*** | (2016.01) |
| ***G06F 12/02*** | (2006.01) |
| ***G06F 13/16*** | (2006.01) |

(52) U.S. Cl.

CPC ...... *G06F 12/0862* (2013.01); *G06F 12/0246* (2013.01); *G06F 13/1615* (2013.01); *G06F 2212/7201* (2013.01)

(58) Field of Classification Search

CPC ............. G06F 12/0862; G06F 12/0868; G06F 12/0292; G06F 12/0246; G06F 2212/7201; G06F 2212/6024; G06F 2212/1016; G06F 2212/602; G06F 2212/7208; G06F 2212/1024; G06F 2213/0026; G06F 3/0611; G06F 3/0655; G06F 3/067; G06F 3/0638; G06F 3/0679; G06F 13/4221; G06F 13/1615

See application file for complete search history.

(56) References Cited

U.S. PATENT DOCUMENTS

| | | | | |
|---|---|---|---|---|
| 2011/0010521 A1* | 1/2011 | Wang | G06F 12/1027 711/E12.078 |
| 2024/0193088 A1* | 6/2024 | Sun | G06N 3/08 |
| 2025/0335366 A1* | 10/2025 | Qin | G06F 12/1009 |

OTHER PUBLICATIONS

Haifeng Li et. al., "HoPP: Hardware-Software Co-Designed Page Prefetching for Disaggregated Memory" Mar. 24, 2023, from the 2023 IEEE International Symposium on High-Performance Computer Architecture, pp. 1168-1181 (Year: 2023).*

* cited by examiner

*Primary Examiner* — Curtis James Kortman

(74) *Attorney, Agent, or Firm* — Lowenstein Sandler LLP

(57) ABSTRACT

A processing device in a memory sub-system receives a first set of requests to access first data stored at a first set of physical addresses. The processing device identifies, using a physical address table comprising information about (i) a host and (ii) an application assigned to respective sets of physical addresses, a first host identity and a first application identity corresponding to the first set of physical addresses. The processing device further provides the first set of requests, the first host identity and the first application identity to a prefetch prediction engine. The processing device receives an output of the prefetch prediction engine, the output comprising a first memory address for prefetching second data from the first set of physical addresses to fulfill a second set of requests.

20 Claims, 6 Drawing Sheets

MEMORY SUB-SYSTEM AWARE PREFETCHING IN A DISAGGREGATED MEMORY ENVIRONMENT

CLAIM OF PRIORITY

The present application claims the benefit under 35 U.S.C. § 119(e) of U.S. Provisional Patent Application No. 63/574,839 filed Apr. 4, 2024, which is incorporated by reference herein.

TECHNICAL FIELD

Embodiments of the disclosure relate generally to memory sub-systems, and more specifically, relate to using memory sub-system aware prefetching in a disaggregated memory environment.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
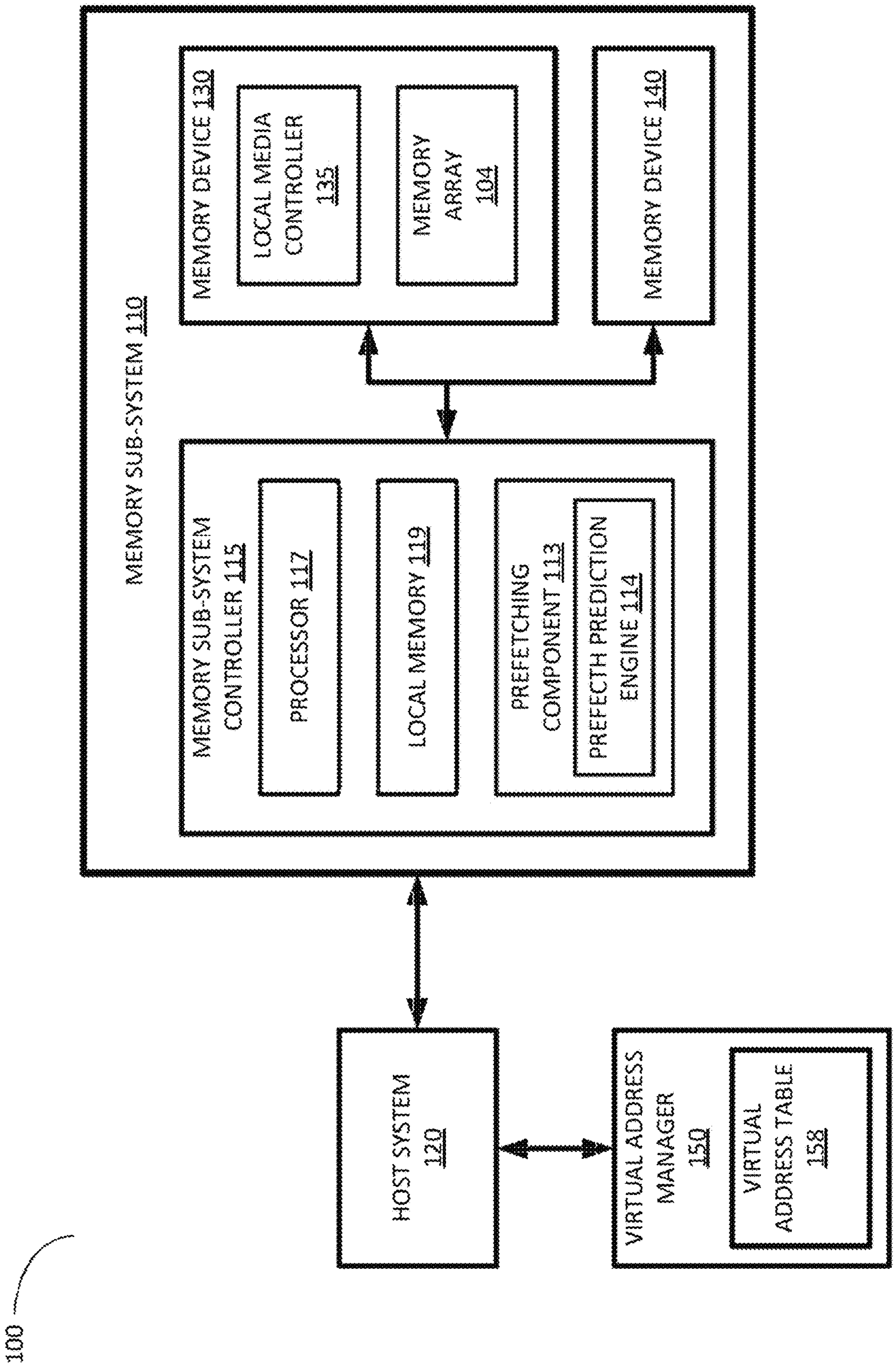
FIG. 1A illustrates an example computing system that includes a memory sub-system in accordance with aspects of the disclosure.

Aspects of the present disclosure are directed to using memory sub-system aware prefetching in a disaggregated memory environment. A memory sub-system can be a storage device, a memory sub-system, or a hybrid of a storage device and memory sub-system. Examples of storage devices and memory sub-systems are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include memory devices used to temporarily store data while power is supplied to the memory device (e.g., volatile memory). A memory sub-system can include memory devices used to retain data when no power is supplied to the memory device. To store and access data of the memory device, the memory device can be sequentially indexed by physical addresses. To write data to the memory device, a write operation can include one or more physical addresses (or a starting physical address), and data to be stored at the one or more physical addresses. To read data from the memory device, a read operation can include one or more physical addresses (e.g., a range of physical addresses), and can return the data stored at the one or more physical addresses.

One example of a non-volatile memory device is a NAND memory device, or 3D flash NAND memory device, which can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a NAND memory device that are used with one or more bitlines to generate the address of each of the memory cells. The intersection of a bitline and wordline constitutes the address of the memory cell. Thus, logic states of individual memory cells in a non-volatile NAND memory device can be stored with a write command that includes the address of the memory cell (identified by the intersection of a bitline and wordline) and the logical state to be stored at the memory cell.

Memory sub-systems can be used in a datacenter with a "disaggregated memory" computer environment, such as a computer environment based on the compute express link (CXL) protocol (e.g., including CXL 2.0, CXL 3.0, CXL 3.1, etc.). In a disaggregated memory environment, memory resources can be decoupled from individual nodes (e.g., servers, hosts, compute units, etc.) within a computing environment. Memory resources can be combined into a shared addressable pool (e.g., disaggregated memory pool, or memory pool) composed of multiple memory sub-systems. The memory resources of the memory sub-systems (e.g., the physical addresses of the memory sub-systems) can be centrally accessible to multiple nodes. Disaggregated memory environments can optimize resource addresses by dynamically distributing memory to high-demand areas, and reduce unnecessary expensive data redundancy. However, a disaggregated memory environment also can present additional challenges, such as a reduction in data integrity and increased latency. Some disaggregated memory environments can increase communication between nodes and memory sub-systems to mitigate some of these challenges, which can result in additional performance penalties.

One method to reduce latency in memory sub-systems in a non-disaggregated memory environment can be with a prefetch algorithm. "Prefetching" can refer to pre-loading data for future memory access operations from slower memory (e.g., memory for long-term data storage) into high performance memory (e.g., cache memory coupled to a compute unit). Prefetching can be implemented in hardware or software. For example, hardware prefetching can be broadly implemented in a system hardware memory controller, or specifically implemented in a memory sub-system. In another example, software prefetching can be broadly implemented in an operating system, or specifically implemented in a software application. Prefetching can be effective when the data to be used in the future can be known. For example, for a particular software application that steps through stored data by sequential physical addresses, data for large units of sequential physical addresses can be prefetched because there can be a high degree of certainty that the software application will request data from sequential addresses of the memory device. Prefetching can be less effective when the data to be used in the future might not be known. For example, for a software application that requests data based on random, or pseudo-random inputs from a user, there might be a low degree of certainty as to what data will be requested in the future, and thus prefetching data might be ineffective.

A "prefetch prediction engine" can refer to an algorithm, model, or series of algorithms and/or models used to predict a memory address to be used for a successive memory operations in a set of memory operations based on past memory operations and associated fields in memory request packets (e.g., priority or data values), a host identity, an application identity, and/or other usage patterns. In some embodiments, prefetching can be performed by determining stride-lengths between related memory access operations (e.g., successive memory access operations for an application of a host system). A "stride" can refer to an interval or gap between memory addresses in successive memory access operations. A "stride length" can refer to the size of the stride, and corresponds to a given set of memory access operations. When memory access operations access data at regular stride intervals (e.g., addresses in successive memory access operations are separated by a regular stride length), data at future memory addresses (e.g., memory addresses that are a stride-length, or whole number multiple of stride length away from a current memory address) can be prefetched and stored in a processing cache, which can reduce memory access latency. However, as described above, prefetching based on stride-length is dependent on accurate knowledge of the stride-lengths, which can be challenging to determine. In some embodiments, prefetching can be determined by predicting the address of future memory access operations using in other ways. That is, while stride-length predictions can use a stride-length (determined by various factors), future address prediction can be performed by prefetching algorithms and components that do not rely on a constant, or semi-constant stride-length between addresses related to memory access operations. For example, a machine learning model can be used to predict the address of future memory access operations independent of a constant stride-length. It should be noted that in some embodiments, prefetching can be performed using a machine learning model trained to predict a constant stride-length based on various inputs to the machine learning model pertaining to memory access operations.

The use of prefetching algorithms in a disaggregated memory environment can present unique challenges, however. For example, when a process or application requests memory addresses to store data, a disaggregated memory pool can allocate from whatever memory resources (e.g., physical memory addresses) are currently available. The disaggregated memory pool can be logically viewed as a continuous resource. Therefore, data for a particular application can be stored in any order across any quantity of memory sub-systems of the disaggregated memory pool, based primarily on which physical addresses were available at the time that the application requested an assignment of memory addresses. In a disaggregated memory environment, a prefetching algorithm used by individual memory sub-systems can be ineffective because each memory sub-system may be "blind" with respect to other memory sub-systems (e.g., a memory sub-system can only store data for a particular memory sub-system, and does not store the contents, or even an indication of what other memory sub-systems do, or do not store). For example, a memory sub-system with a prefetching algorithm can receive only some of the memory access requests for a particular application or process, and thus the prefetching algorithm will have a limited set of inputs on which to predict future memory access requests. A prefetching algorithm used by a host can be similarly ineffective. Because memory resources can be allocated based on availability at the time the addresses are requested, there might not be a pattern or connection between the physical addresses of multiple memory sub-systems that have been used to store data for a particular application of the host. In some disaggregated memory environments where hosts do implement a prefetching algorithm, the high degree of control over the host and other devices in the environment can be prohibitively intrusive and complex.

Aspects of the present disclosure address the above and other deficiencies by using memory sub-system aware prefetching in a disaggregated memory environment. A memory sub-system can include a physical address table with entries that indicate (i) a host identity, and (ii) an application identity assigned to sets of physical addresses in the memory sub-system (e.g., physical addresses of a memory device). When the memory sub-system receives a request for data at a particular set of physical addresses, the memory sub-system can use the physical address table to identify the particular host, and/or the particular application requesting the data. Thereafter, while memory access operations continue to be received for the particular set of physical addresses, the memory sub-system can filter out unrelated memory access operations (e.g., memory access operations related to other applications and/or other hosts) from being used as input into the prefetch prediction engine. In this way, the memory sub-system can use a prefetch prediction engine to predict the memory addresses of future memory access operations for the particular application on the particular host.

The physical address tables on the memory sub-systems can be made possible in part due to a contiguous mapping of sets of contiguous physical addresses (e.g., physical addresses of multiple memory sub-systems) to a set of contiguous virtual addresses of a disaggregated memory pool. A virtual address manager can assign contiguous blocks of virtual addresses (mapped to corresponding contiguous blocks of physical addresses) to respective applications of a respective host. Thus, because the data for a particular application of a particular host can be stored contiguously in physical memory (e.g., often on a single memory sub-system), when the host requests data, a prefetching algorithm on the memory sub-system can more effectively predict the location of, and proactively retrieve data stored at physical addresses of future memory access operations. The physical address tables of a respective memory sub-system can reflect a portion of a master addressing table that corresponds to the physical addresses of the respective memory sub-system. The master addressing table (e.g., a virtual address table) can be generated and stored by a global allocator (e.g., a virtual address manager).

Advantages of the approach described herein include, but are not limited to, improved performance in the memory sub-system and disaggregated memory environment. By making virtual addresses of a memory access operation available to a prefetching prediction engine (e.g., a prefetcher), system and memory sub-system overhead can be reduced. Accurate prefetching algorithms can reduce memory access latency in the memory sub-system and in the environment. Input noise for a prefetching algorithm implemented on the memory sub-system can be reduced by filtering memory access operations for specific applications on specific hosts that can perform the series of memory access operations. A reduction in input noise for a prefetching algorithm increases the likelihood that the prefetching algorithm will produce accurate prefetching predictions, thus reducing memory access latency. In contiguous virtual memory allocations (e.g., a disaggregated memory environment with a set of contiguous virtual addresses), prefetching algorithms used for an application or host for one subset of the virtual addresses can be reused for other subsets of virtual addresses that are accessed in the same way by the same application or host, instead of re-predicting prefetching memory addresses for each new subset of memory addresses based on non-ordered, arbitrary, or semi-random physical memory address arrangements.

FIG. 1A illustrates an example of a computing system 100 that includes a memory sub-system 110 in accordance with some embodiments of the present disclosure. The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. The computing system 100 can include a host system 120 that can be coupled to one or more memory sub-systems 110. In some embodiments, the host system 120 can be coupled to different types of memory sub-system 110. FIG. 1A illustrates one example of a host system 120 coupled to one memory sub-system 110. As used herein, “coupled to” or “coupled with” generally refers to a connection between components, which can be an indirect communicative connection or direct communicative connection (e.g., without intervening components), whether wired or wireless, including connections such as electrical, optical, magnetic, etc.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory sub-system (DIMM), a small outline DIMM (SO-DIMM), and various types of non-volatile dual in-line memory modules (NVDIMMs).

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, Compute Express Link interface (CXL), universal serial bus (USB) interface, Fibre Channel, Serial Attached SCSI (SAS), a double data rate (DDR) memory bus, Small Computer System Interface (SCSI), a dual in-line memory sub-system (DIMM) interface (e.g., DIMM socket interface that supports Double Data Rate (DDR)), etc. The physical host interface can be used to transmit data between the host system 120 and the memory sub-system 110. In some embodiments, the physical host interface can include the virtual address manager 150. The host system 120 can further utilize an NVM Express (NVMe) interface to access the memory components (e.g., the one or more memory device(s) 130, or the memory device 140) when the memory sub-system 110 can be coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

Each of the memory device(s) 130 of the memory sub-system 110 can be indexed by a set of physical addresses. Physical addresses of the memory device can be stored in an address lookup table. In the illustrated example, address lookup table can be included in the memory sub-system controller 115 as a part of local memory 119 however, the address lookup table can also be a separate component of memory sub-system 110, included in the memory device 130, or can be external to the memory sub-system 110. In some embodiments, the address lookup table can be stored and maintained by prefetching component 113.

The memory sub-system 110 includes a memory sub-system controller 115 that can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers to store memory pointers, fetched data, etc. The local memory 119 can also include read-only memory (ROM) to store micro-code. While the illustrative example of the memory sub-system 110 in FIG. 1A has been illustrated as including the memory sub-system controller 115, in another embodiment of the present disclosure, a memory sub-system 110 does not include a memory sub-system controller 115, and can instead rely on external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 can be a managed memory device, which can be a raw memory device (e.g., memory array 104) having control logic (e.g., local media controller 135) for media management within the same memory device package. An example of a managed memory device can be a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the computing system 100 can include a virtual address manager 150. When one or more host systems (e.g. host system 120) require memory resources (e.g., for an application), host system 120 can send a request for memory resources (e.g., memory addresses) to the virtual address manager 150. Based on the request received from host system 120, the virtual address manager 150 can assign the host system 120 a contiguous set of virtual addresses from the virtual address table 158. The set of virtual addresses can map to a contiguous set of physical addresses of memory sub-system 110. The virtual address table 158 can map virtual addresses 1:1 to each physical address in a disaggregated memory pool. For example, in a disaggregated memory pool with two identical memory sub-systems, the virtual address table 158 can have distinct virtual addresses that map 1:1 to each physical address of the two memory sub-systems.

In some embodiments, the virtual address manager 150 can have multiple distinct portions that each correspond to the quantity of physical memory addresses in a respective memory sub-system of a disaggregated memory pool. For example, a virtual address table 158 for a disaggregated memory pool with ten identical memory sub-systems could have ten identically sized portions of the virtual address table 158, with each portion corresponding to the physical addresses of the respective memory sub-systems. Once the host system 120 has received an assignment of virtual addresses from the virtual address table 158, the host system 120 can communicate directly with the memory sub-system 110 that contains the physical addresses that are contiguously mapped to the assigned virtual addresses.

In some embodiments, the virtual address manager 150 can serve as an intermediary between the host systems 120 and memory sub-systems 110 (not illustrated). In such embodiments, the virtual address manager 150 can be implemented in a disaggregated memory switch, such as a CXL switch, as described in the CXL 2.0 and later documentation. In some embodiments, the virtual address manager 150 can be software-implemented as a CXL fabric manager. As used herein, a CXL fabric manager is a software application that can dynamically provision CXL-connected resources based on workload demands, prioritize certain workloads, suggest physical layouts for CXL-connected resources to optimize performance, and perform other adjustments to the CXL-connected resources. In some embodiments, a CXL fabric manager application can be software or firmware that is executed by the CXL switch. In some embodiments, the CXL fabric manager can be software or firmware that is executed by server (not illustrated), or component of computing system 100. In some embodiments, the CXL fabric manager can be software or firmware that is executed by a dedicated CXL fabric manager device.

As described above, while computing system 100 includes a host system 120 and a memory sub-system 110, computing system 100 can include additional host systems and/or memory sub-systems (e.g., host systems 120 and memory sub-systems 110). In embodiments of computing system 100 with multiple host systems 120 and multiple memory sub-systems 110, computing system 100 can include a virtual address manager 150. In some embodiments, virtual address manager 150 can be a part of host system 120. In embodiments of computing systems 100 with multiple host systems 120, a host system 120 can include the virtual address manager 150. The virtual address table 158 can be generated and stored by virtual address manager 150. The virtual address table 158 can be a master version of the virtual address table 158. In some embodiments, each host system 120 of computing system 100 can include a copy of the virtual address table 158. In some embodiments, the copies of the virtual address table 158 on each host system 120 can be read-only. In some embodiments the virtual address table 158 generated by the virtual address manager 150 can be accessible by each host system of the computing system 100.

In one embodiment, the memory sub-system 110 includes a prefetching component 113 (e.g., a "prefetcher") that can filter memory access operations by a particular host and/or particular application for use as input to the prefetch prediction engine 114. The prefetching component 113 can include a physical address table that identifies the host and/or application that corresponds to physical addresses of the memory device 130. The physical address table can also include, or perform the functions of an address translation table, however, the two tables can be distinct. The address translation table can translate an address included in an incoming request into a physical address of the memory device 130. The physical address table can identify a host and/or application that corresponds to physical addresses. Based on an output of the prefetch prediction engine 114, the prefetching component 113 can prefetch data for future memory access operations. Entries in the physical address table of the prefetching component 113 can include indications of sets of physical addresses that have been assigned to a respective application of a respective host (e.g., host system 120). When the memory sub-system 110 receives a memory access request for data at a set of physical memory cell addresses, the prefetching component 113 can use the physical address table to determine a particular host and a particular application that corresponds to the memory access operation, based on the set of physical memory cell addresses. In some embodiments, the virtual address manager 150 can maintain a virtual-to-physical address mapping table (e.g., such as virtual address table 158, or a portion of virtual address table 158). In some embodiments, the virtual address manager 150 can maintain a physical-to-virtual address mapping table (e.g., such as virtual address table 158, or a portion of virtual address table 158). In some embodiments, a respective host performing an application can provide the prefetching component 113 with the virtual addresses used for the application, and the prefetching component 113 can perform a reverse lookup of the virtual address table 158 to identify the physical addresses corresponding to the received virtual addresses. The prefetch prediction engine 114 can accept as inputs, the set of memory access operations, the host identification, and the application identification. In this way, prefetching component 113 can filter the input to prefetch prediction engine 114 to reduce potential input noise of memory access operations that do not pertain to the particular host and particular application. A reduction in input noise to the prefetch prediction engine 114 can yield more accurate predicted outputs. In some embodiments, the prefetch prediction engine 114 can simultaneously determine multiple memory address predictions (e.g., memory addresses of future memory access operations for multiple applications). Further details with regards to the operations of prefetching component 113 are described below.

Figure 1B:
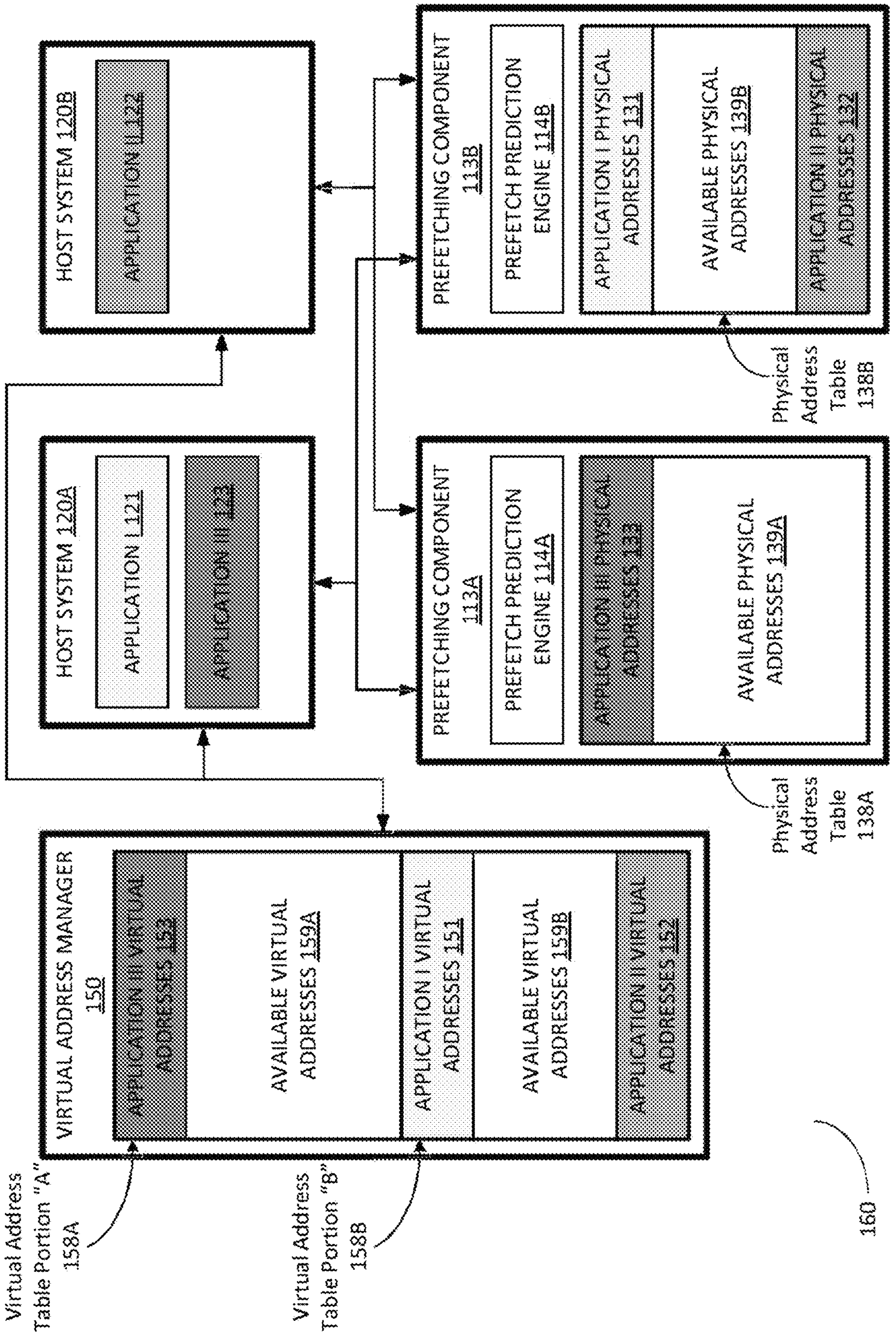
FIG. 1B is a block diagram of a computing environment that illustrates interactions between multiple host systems and prefetching components of multiple memory sub-systems, in accordance with aspects of the disclosure.

FIG. 1B is a block diagram of computing environment 160 that illustrates interactions between multiple host systems 120 and prefetching components 113 of multiple memory sub-systems (not illustrated, e.g., memory sub-systems 110) in accordance with aspects of the present disclosure. In the illustrated example, computing environment 160 depicts a virtual address manager 150, host system 120A and host system 120B. For clarity, computing environment 160 does not illustrate memory sub-systems 110, or memory devices 130, but instead illustrates only prefetching component 113A and prefetching component 113B of respective memory sub-systems. That is, prefetching component 113A can be a part of a memory sub-system 110 and interacts with a respective memory device (e.g., a memory device 130), and prefetching component 113B can be a part of another memory sub-system 110 and interacts with another respective memory device (e.g., a memory device 130).

Host system 120A and host system 120B can be host systems 120 as described with respect to FIG. 1A. In the illustrated example, host system 120A includes Application I 121, and Application III 123, and host system 120B includes Application II 122. The applications I, II, and III (121, 122, and 123 respectively) can refer to software applications that can currently be performed on respective host systems (e.g., host systems 120), or software applications that have a dedicated assignment of memory addresses (e.g., such as non-volatile memory addresses for memory storage when power is removed from the memory device). In some embodiments, an application can refer to a computer process, or execution thread of a compute unit.

Prefetching component 113A and prefetching component 113B can each be a prefetching component 113 as described with respect to FIG. 1A. Accordingly, prefetching components 113A-B are each a part of respective memory sub-systems (such as memory sub-system 110, not illustrated), and interface with respective memory devices (such as memory device 130, not illustrated). Prefetching components 113A-B each include a prefetch prediction engine 114A and 114B, and a physical address table 138A and 138B, respectively. Host systems 120 can interface with any memory sub-system in a disaggregated memory pool.

Prefetch prediction engine 114 can accept as input, (i) memory access operations data, including physical addresses of the memory access operations, and (ii) host identifiers and application identifiers. Using one or more predetermined algorithms, and based on the memory access operations data, prefetch prediction engine 114 can predict a stride-length between future memory access operations, or a memory address for one or more future memory access operations. A prefetch prediction engine 114 can be an algorithm, model, or series of algorithms and/or models used to predict a memory address of future memory access operations. In some embodiments, the prefetch prediction engine 114 can predict one or more memory addresses based as a function of stride-length predictions between successive memory operations in a set of memory operations based on past memory operations, a host identity, an application identity, and/or other usage patterns.

The prefetch prediction engine 114 can be implemented in any combination of hardware, firmware, and/or software. In some embodiments, the prefetch prediction engine 114 can be a pretrained machine learning model. In some embodiments, the pretrained machine learning model of the prefetch prediction engine 114 can be refined over the life of memory sub-system 110 (e.g., the pretrained machine learning model can be continuously, or intermittently trained with refining training data). The prefetch prediction engine 114 can include predetermined algorithms and/or models that are loaded onto a memory sub-system during runtime operation or during production of the memory sub-system. In some embodiments, the prefetch prediction engine remains constant for the life of the memory sub-system. In some embodiments, the prefetch prediction engine can be updated by the memory sub-system controller in response to triggering events (e.g., lifecycle events of the memory sub-system). In some embodiments, the prefetch prediction engine can be reconfigurable by a user, such as through a firmware update for a memory sub-system.

A stride-length can refer to a difference between physical addresses associated with respective memory access operations. For example, the stride-length between a memory access operation for the physical address 0x0000 and a memory access operation for the physical address 0x0008, can be represented as 0x0008. In another example, the stride-length between memory addresses 0x0020 and 0x0030 can be represented as 0x0010. Thus, stride-length history can indicate a pattern of addresses associated with memory access requests. For example, if prefetch prediction engine 114 predicts the stride-length to be 0x0040, and the most recent memory access operation was performed at memory address 0x0080, prefetching component 113 can prefetch data stored at memory address 0x00C0 (i.e., 0x0040+0x0080). In some embodiments, a "distance" factor d can be used to determine or predict a stride-length. For example, prefetch prediction engine 114 can output a distance factor, d (e.g., some integer or ratio), and prefetching component 113 can prefetch data stored at memory address 0x0080+(d*0x0040).

Physical address tables 138 can store host identifiers and application identifiers for respective sets of physical memory addresses. In the illustrated example, Application I physical addresses 131 are associated in the physical address table 138A with Application I of host system 120A; Application II physical addresses 132 are associated in the physical address table 138B with Application II of host system 120B; and Application III physical addresses 133 are associated in the physical address table 138A with Application III of host system 120A. When a physical address is translated for a memory access operation, the physical address can be mapped to the respective host identifier and application identifier in the physical address table. In some embodiments, the physical address table 138 can translate data from a memory access operation into a physical address. In some embodiments, the physical address table 138 can be used as a reference table to identify the host identifier and application identifier for an already translated physical address. As described above, once the host identifier and application identifier have been determined, each can be used as input to the prefetch prediction engine 114.

Physical address tables 138 can reflect portions of virtual address table 158. In the illustrated example, virtual address table 158 includes two portions, portion "A" 158A having available virtual addresses 159A, and portion "B" 158B having available virtual addresses 159B. In the illustrative example of FIG. 1B, portion A 158A includes Application III virtual addresses 153, and portion B 158B includes Application II virtual addresses 152. Each portion of virtual address table 158 includes virtual addresses that map 1:1 to physical addresses of memory sub-systems (e.g., such as memory sub-systems 110). In the illustrated example, portion A 158A includes virtual addresses of virtual address table 158 that contiguously map 1:1 to physical addresses of physical address table 138A. Portion B 158B includes virtual addresses of virtual address table 158 that contiguously map 1:1 to physical addresses of physical address table 138B. Physical address tables 138 can be updated from the virtual address table 158 when virtual addresses are assigned to a respective memory sub-system associated with the physical address table 138, or when virtual addresses are unassigned from the respective memory sub-system associated with the physical address table 138. For example, in the illustrated example, after Application I virtual addresses 151 are unassigned from the memory sub-system associated with physical address table 138B, Application I virtual addresses 151 will become available virtual addresses 159B. Subsequently, physical address table 138B can be updated to reflect the portion B 158B of virtual address table 158, such that Application I physical addresses 131 will become available physical addresses 139B.

Physical address tables 138 can be generated (or updated) based on the respective corresponding portion of the virtual address table 158. The mapping between entries of the respective physical address tables (e.g., physical address tables 138) and entries of the virtual address table 158 can be 1:1. Each physical address table 138 can include one or more of a set of physical addresses assigned to an application, or a set of available physical addresses (e.g., available physical addresses 139A of physical address table 138A, or available physical addresses 139B of physical address table 138B). In some embodiments, physical address tables 138 can be device specific (e.g., can only include address information for physical addresses of a respective memory device). In some embodiments, physical address tables 138 can include physical address information pertaining to all physical devices associated with the virtual address table 158. Each mapping between a virtual address of virtual address table 158 and a physical address of physical address table 138 can be distinct or 1:1. That is, the number of entries for virtual addresses in the virtual address table 158 can equal the number of entries for physical addresses in one or more physical address tables 138. In some embodiments, the number of entries pushed to a physical address table can be based on a size of the application allocation. Application allocations that are larger than a threshold allocation size can be assigned virtual addresses from the virtual address table 158. Application allocations that are smaller than the threshold allocation size can be assigned physical addresses corresponding to the respective host system (e.g., corresponding to the host system 120A or host system 120B. In some embodiments, the threshold allocation size is configurable.

In the illustrated example, when host system 120A can request memory addresses for Application I, a set of virtual addresses of portion "B" 158B are assigned to Application I for host system 120A, (e.g., in the illustrated example as Application I virtual addresses 151). The contents of portion "B" 158B of the virtual address table 158 can be copied to the corresponding physical address table in prefetching component 113B (e.g., physical address table 138). In some embodiments, the full contents of portion "B" 158B can be copied to the physical address table 138B. In some embodiments, a part of the portion "B" 158B (e.g., the updated part) can be copied to the physical address table 138B, while the remaining parts of the portion "B" 158B (e.g., the non-updated parts) are not copied to the physical address table 138B.

In some embodiments, physical address table 138A can be updated responsive to a command from the host system 120. In some embodiments, the command from the host can indicate to the virtual address manager 150 to push an updated portion of the virtual address table 158 to a respective physical address table (e.g., physical address table 138B). The command from the host can be due to a recent assignment of memory resources (e.g., memory addresses to store data) or a recent un-assignment of memory resources. In the illustrated example, host system 120A can indicate to the memory sub-system that includes prefetching component 113A that Application III physical addresses 133 are no longer needed. Once memory access operations from host system 120A for the physical addresses of Application III physical addresses 133 are no longer being received, prefetching component 113A can purge the entries for the Application III physical addresses 133 in the physical address table 138A. Prefetching component 113A can indicate to the virtual address manager 150 that the virtual address table 158 can be updated. The contents of the physical address table 138A can be duplicated to portion "A" 158A to update the virtual address table 158. In some embodiments, the full contents of physical address table 138A can be copied to the portion "A" 158A. In some embodiments, a part of the physical address table 138A (e.g., the updated part) can be copied to the portion "A" 158A, while the remaining parts of the physical address table 138A (e.g., the non-updated parts) are not copied to the portion "A" 158A. In some embodiments, virtual address manager 150 can directly update physical address tables 138.

Virtual address manager 150 can include a virtual address table 158. In the illustrated example, virtual address manager 150 includes two portions of a virtual address table 158; portion "A" 158A, and portion "B" 158B. However, more, or fewer portions of the virtual address table 158 can be included in virtual address manager 150. As described above, each portion of the virtual address table 158 corresponds to a physical address table 138 (i.e., virtual addresses map 1:1 to physical addresses). In the illustrated example, portion "A" 158A corresponds to physical address table 138A, and portion "B" 158B corresponds to physical address table 138B. Virtual address table 158 can represent a single contiguous virtual addressing scheme for all physical addresses available in a disaggregated memory pool. When a host system 120 requests memory resources (e.g., memory addresses to store data), virtual address manager 150 can use the virtual address table 158 to assign a contiguous set of physical addresses in a memory sub-system 110 of the disaggregated memory pool. As described above, each portion of the virtual address table (e.g., portion "A" 158A, portion "B" 158B) can directly map to a respective physical address tables (e.g., physical address table 138A, physical address table 138B). When virtual addresses have been assigned to a host system 120, the corresponding physical addresses of a respective memory sub-system (not illustrated) can be assigned to the host system 120. In some embodiments, an assignment of virtual addresses can be considered an allocation of memory. The assignment of virtual addresses can be reflected in the virtual address table 158 by indicating, for each virtual address or group of virtual addresses, a host identification, and an application identification. The assignment of physical addresses can be reflected in a physical address table 138 of the respective memory sub-system. In some embodiments, virtual addresses and physical addresses can be assigned in discrete groups or "units." The size of the assignment units can be the same for both the virtual addresses and the physical addresses. For example, virtual addresses in a virtual address table 158 might be assigned in one gigabyte units (e.g., by the number of virtual addresses needed to store one gigabyte of data). In such embodiments, the size of the virtual address table 158 and sizes of corresponding physical address tables (e.g., physical address tables 138) can be reduced significantly, based on the size selected for each unit.

Figure 2A:
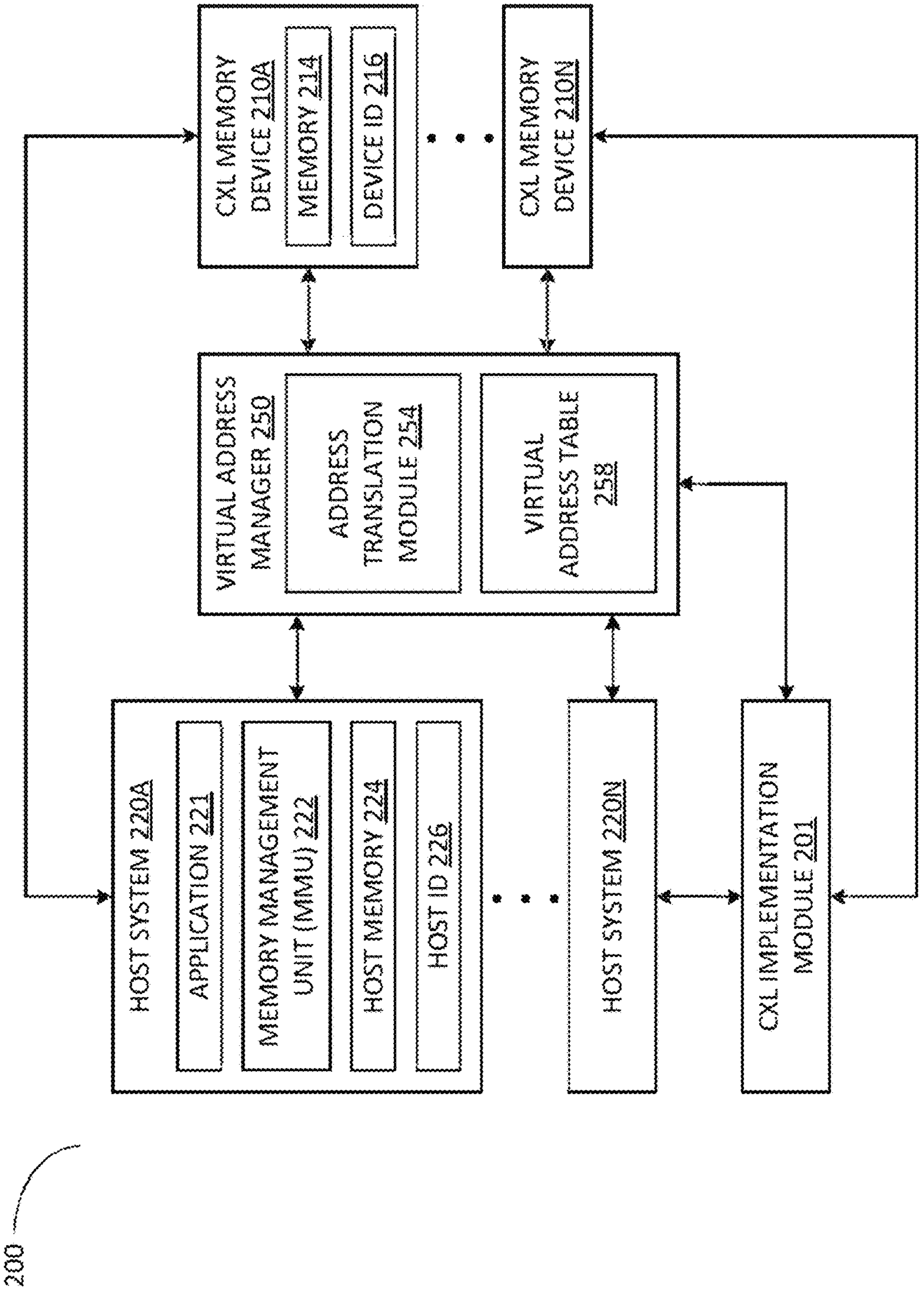
FIG. 2A illustrates an example of a disaggregated memory environment that includes a virtual address manager, in accordance with aspects of the disclosure.

FIG. 2A illustrates an example of a disaggregated memory environment 200 that includes a virtual address manager 250, in accordance with aspects of the disclosure. In some embodiments, the virtual address manager 250 can be a virtual address manager 150 described with reference to FIGS. 1A-B. The virtual address manager 250 can be one of the computing devices including the disaggregated memory environment 200. Examples of such computing devices can include a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. FIG. 2A illustrates one example of a virtual address manager 250 coupled to one or more CXL memory devices 210A-N (e.g., CXL memory device 210A, or CXL memory device 210N, also referred to herein as "CXL memory device 210") and host systems 220A-N (e.g., host system 220A, or host system 220N, also referred to herein as "host system 220"). CXL memory devices 210A-N can also be directly coupled to host systems 220A-N. Additionally, host systems 220A-N, CXL memory device 210A-N, and virtual address manager 250 can be coupled to other components of disaggregated memory environment 200 through CXL implementation module 201.

CXL implementation module 201 can be a CXL switch, CXL fabric manager, or other component used to implement and/or facilitate CXL communications within the disaggregated memory environment 200. CXL implementation module 201 can be included in any of host systems 220A-N or other components of disaggregated memory environment 200, or as in the illustrated example, can be a standalone component of disaggregated memory environment 200. In some embodiments, CXL implementation module 201 can include and perform the operations of virtual address manager 250. CXL implementation module 201 can refer to any combination of a hardware, firmware, or software module.

In some embodiments, logic within the CXL implementation module 201 can transform the virtual memory address to a physical address (or vice versa). The translation from a virtual address to a physical address can include two general steps. First, determining whether the address is a local address or a non-local address, and second, mapping the address based on the local/non-local determination of the first step. A memory management unit (MMU) associated with a host (e.g., memory management unit 222 of host system 220) can determine whether the virtual address maps to an address in the virtual global address pool (e.g., first step) and if so, whether it maps to a local segment or a remote segment (e.g., a segment on the host system 220, or a segment on another host system such as host system 220N, or CXL memory device 210A-N). If the address maps to a local segment, the MMU can map the virtual address to a local physical address (e.g., second step); if the address maps to a remote segment, the request can be forwarded to the CXL implementation module 201 (or virtual address manager 250) to determine which remote device hosts the target segment (e.g., host system 220N, CXL memory devices 210A-N, etc.). Once the remote device has been determined, the request can be sent to the appropriate physical device. Additional details regarding logic pertaining to fulfilling a memory access request in the disaggregated memory environment 200 are described with reference to FIG. 2B.

CXL memory device 210 can refer to a memory device in a disaggregated memory environment 200 that is configured to provide memory resources (e.g., memory 214) as a part of a shared memory pool, per the CXL protocol. In some embodiments, the CXL memory device 210 can be a memory sub-system 110 as described with reference to FIG. 1A, and memory 214 can be a memory device 130. CXL memory device 210 includes a device ID 216. Device ID 216 can include both a physical device ID and a virtual device ID. The physical device ID can be a unique physical ID that was assigned to the CXL memory device 210 during production of the CXL memory device 210, and is non-configurable (e.g., read-only). The virtual device ID can be a unique virtual ID that is assigned by the virtual address manager 250 and/or the CXL implementation module 201. The device ID 216 can be used to construct a memory address for data stored at memory 214 of the CXL memory device 210A. For example, virtual address manager 250 can use the virtual device ID as a part of the virtual addresses assigned to the physical memory addresses of memory 214.

Host system 220 can refer to a system in a disaggregated memory environment 200 configured to perform certain operations, including hosting the application 221. In some embodiments, host system 220 can be a host system 120 as described with reference to FIGS. 1A-B. Host system 220 includes application 221 (e.g., hosts, or performs application 221), memory management unit 222, host memory 224, and host ID 226.

Application 221 can be an application such as application I 121, application II 122, or application III 123 as described with reference to FIG. 1B. When application 221 requests to perform a memory access operation (e.g., read data from memory, write data to memory, etc.), the memory access operation request can be sent to memory management unit 222. Memory management unit 222 can determine whether the memory address provided by the application 221 corresponds to a global shared memory region (e.g., memory addressable by virtual addresses of the virtual address table 258) or to host memory 224. If the memory address in the request corresponds to host memory 224, the host system 220 processes the command without using the virtual address manager 250. If the memory address in the request does not correspond to host memory 224, the host system 220 (via memory management unit 222) sends the memory access operation request to the virtual address manager 250 for processing. In some embodiments, if the memory address in the request does not correspond to host memory 224, memory management unit 222 can check a local address cache to determine whether the virtual memory address mapping is stored in the local address cache. If the cache includes a virtual memory address mapping for the memory address in the request, the host system 220 can process the request by sending the request to the appropriate physical component that corresponds to the memory address in the request (e.g., another host system (e.g., host system 220N), a CXL memory device 210A-N, etc.) and receiving back the requested data.

In some embodiments, the memory management unit 222 can determine whether the memory address corresponds to the host memory 224 based on the host ID 226 and/or the device ID 216 encoded in the memory address. For example, the memory address can include an indicator that the memory address is a virtual address and an indicator of the device ID 216. In some embodiments, the memory address can include an indicator that the device ID 216 is a virtual device ID. In some embodiments, the virtual device ID in a memory address can be replaced with a corresponding physical device ID to convert the virtual address into a physical address. If there is no device ID 216 indicated in the memory address, or if, when sent to the virtual address manager 250, no device ID 216 corresponds to the request, the virtual address manager 250 can assign a set of virtual addresses to the memory request and a corresponding unique global ID to the set of virtual addresses. This assignment of virtual addresses is described above with reference to FIG. 1B.

Virtual address manager 250, as previously described, can be a virtual address manager 150 as described with reference to FIGS. 1A-B, and can be included in any of host system 220A-N (not illustrated). When the virtual address manager 250 receives a memory access operation request (e.g., from host system 220), the address translation module 254 can translate the memory address provided by the host system 220 from a physical address into a virtual address. In some embodiments, the address translation module 254 can systematically check the virtual address table 258 for entries corresponding to a received memory access request. In some embodiments, the virtual address table 258 can include various fields such as a register identifier, a bit quantity, a bit offset, a field type, and a description of virtual memory addresses and/or virtual memory address operations for the global virtual memory address pool. In some embodiments, the address translation module 254 can translate the received memory address into a fabric physical address to be used by CXL implementation module 201 to determine routing information for routing the physical address to the proper destination device. In some embodiments, once the virtual address manager 250 has assigned a set of virtual memory addresses and/or properly routed a memory access request from a host system 220, the virtual address manager 250 can indicate to the host system a mapping between the physical memory address and the associated virtual memory address. The host system 220 can then store the mapping in a cache for later use. Virtual address mappings stored in a cache on the host system 220 enable the host system 220 to bypass the virtual address manager 250 (and/or the CXL implementation module) and directly communicate the memory access request to the physical component associated with the memory addresses of the memory request (e.g., another host system such as host system 220N, a CXL memory device 210A-N, etc.).

Figure 2B:
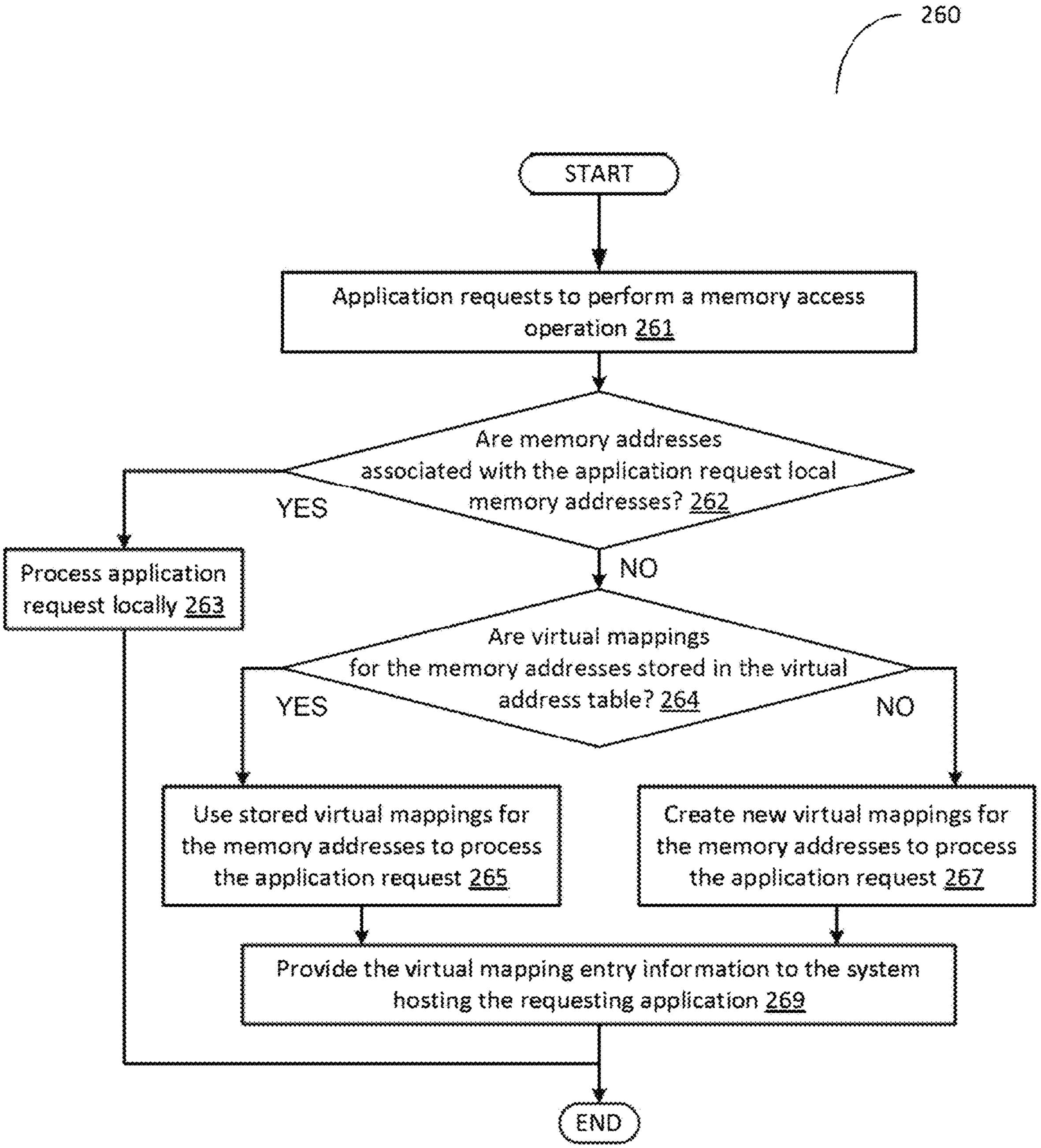
FIG. 2B is a flow diagram of an example of a method of a memory sub-system aware prefetching, in accordance with aspects of the disclosure.

FIG. 2B is a flow diagram of an example of a method 260 of a memory sub-system aware prefetching, in accordance with aspects of the present disclosure. The method 260 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 260 is performed by various components in a disaggregated memory environment 200 of FIG. 2A. Although illustrated in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 261, an application requests to perform a memory access operation. As described above with reference to FIG. 1B, the application can be hosted on a host system, and the memory access operations can include operations such as read operations, write operations, erase operations, etc.

At operation 262, processing logic (e.g., a memory management unit associated with the application) determines whether the memory addresses associated with the application request are local memory addresses (e.g., memory addresses of the host performing the application). Responsive to determining the memory addresses associated with the application request are local memory addresses ("YES"), the method can proceed to operation 263. Responsive to determining the memory addresses associated with the application request are not local memory addresses ("NO"), the method can proceed to operation 264.

At operation 263, responsive to determining that the memory addresses associated with the application request are local memory addresses, the application request can be processed locally, after which the method can be terminated.

At operation 264, responsive to determining the memory addresses associated with the application request are not local memory addresses, the memory request can be sent to the virtual address manager 250, and processing logic (e.g., address translation module 254) can determine whether there are virtual mappings for the memory addresses stored in the virtual address table 258. Responsive to determining if there are virtual mappings for the memory addresses associated with the application request in the virtual address table 258 ("YES"), the method can proceed to operation 265. Responsive to determining there are no virtual mappings for the memory addresses associated with the application request in the virtual address table 258 ("NO"), the method can proceed to operation 267.

At operation 265, responsive to determining if there are virtual mappings for the memory addresses associated with the application request in the virtual address table 258, the respective stored virtual mappings in the virtual address table 258 can be used to process the application request.

At operation 267, responsive to determining there are not virtual mappings for the memory addresses associated with the application request in the virtual address table 258, processing logic (e.g., address translation module 254) can create new virtual mappings for the memory addresses to process the application request.

At operation 269, processing logic of the virtual address manager 250 (e.g., address translation module 254) can provide virtual mapping entry information to the system hosting the requesting application (e.g., host system 220). Subsequently, processing logic of the host system 220 (e.g., memory management unit 222) can process the application request based on the information provided by the virtual address manager 250. In some embodiments, the virtual mapping information provided by the virtual address manager 250 can be stored in a cache associated with the memory management unit. In alternative embodiments, the application request can be performed in full or in part by the virtual address manager 250, and/or CXL implementation module 201. Upon performing the application request, the method can be terminated.

Figure 3:
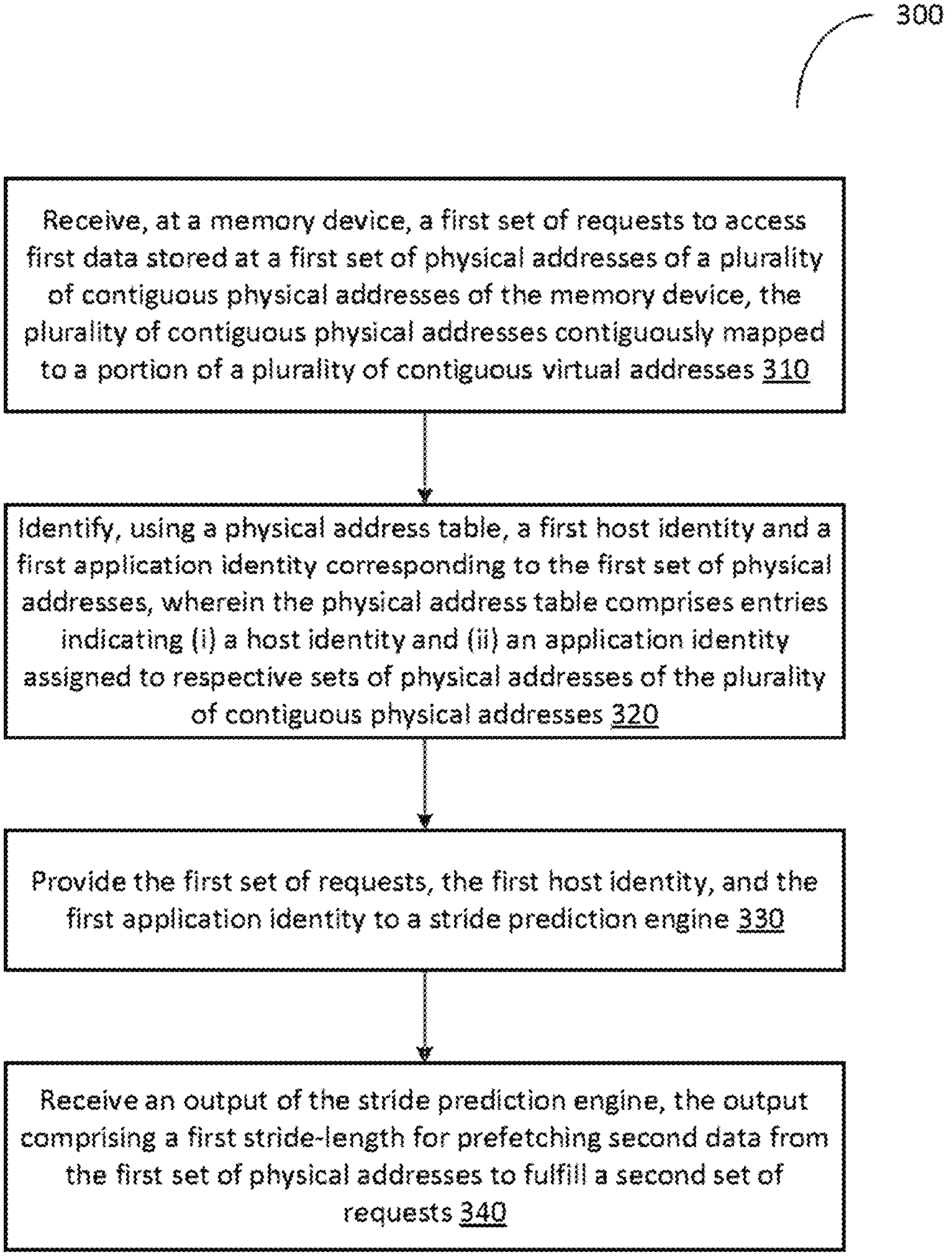
FIG. 3 is a flow diagram of an example method of a memory sub-system aware prefetching, in accordance with aspects of the disclosure.

FIG. 3 is a flow diagram of an example of a method 300 of a memory sub-system aware prefetching, in accordance with aspects of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the processing logic can be performed by a processing device that is operatively coupled to the memory device. In some embodiments, the method 300 is performed by prefetching component 113 of FIGS. 1A-B. Although illustrated in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic (e.g., prefetching component 113) receives, at a memory device (e.g., memory device 130), a first set of requests to access first data stored at a first set of physical addresses of a plurality of contiguous physical addresses of the memory device, the plurality of contiguous physical addresses contiguously mapped to a portion of a plurality of contiguous virtual addresses (e.g., virtual addresses managed by the virtual address manager 150). As described above, the plurality of contiguous virtual addresses can be stored in a centrally accessible virtual address table. In some embodiments, the virtual address table can be generated and maintained by a virtual address manager (e.g., a global allocator).

At operation 320, the processing logic identifies, using a physical address table (e.g., physical address table 138A or physical address table 138B), a first host identity (e.g., an identity of host system 120A) and a first application identity (e.g., an identify of application I 121) corresponding to the first set of physical addresses, wherein the physical address table comprises entries indicating (i) a host identity and (ii) an application identity assigned to respective sets of physical addresses of the plurality of contiguous physical addresses. In some embodiments, processing logic can send the first data to a host identified by the host identity. As described above, the physical address table can reflect a portion of the virtual address table. In some embodiments, the physical address table can be updated at the time that physical addresses have been assigned to an application of a host system. For example, after the virtual address manager assigns virtual addresses to an application of a host system, the portion of the virtual address table that is updated to reflect the assignment can be duplicated to the physical address table of the memory sub-system that includes the physical addresses that map to the assigned virtual addresses (as illustrated in FIG. 1B). In some embodiments, the physical address table can be updated at the time that physical addresses have been unassigned from an application of a host system. For example, after the virtual address manager unassigns virtual addresses from the application of the host system, the portion of the virtual address table That is updated to reflect the un-assignment can be duplicated to the physical address table of the memory sub-system that includes the physical addresses that map to the unassigned virtual addresses (as illustrated in FIG. 1B). In some embodiments the host system that has requested the assignment or un-assignment or virtual addresses can perform the duplication to the respective memory sub-systems. In some embodiments, the host systems can indicate to the respective memory sub-system that the physical address assignment is no longer needed, and to the virtual address manager that the virtual address assignment is no longer needed. In such embodiments, the virtual address manager can duplicate a copy of the physical address table from the respective memory sub-system to the corresponding portion of the virtual address table maintained by the virtual address manager.

At operation 330, the processing logic provides the first set of requests, the first host identity, and the first application identity to a prefetch prediction engine (e.g., prefetch prediction engine 114). The first set of requests can be the first portion of a string of related requests that pertain to an application of a host system. In some embodiments, the first set of requests can be a first predetermined number of received requests from a host system. In some embodiments, the first set of requests can be a first predetermined number of requests in a memory access operation queue.

At operation 340, the processing logic receives an output of the prefetch prediction engine, the output comprising a first memory address for prefetching second data from the first set of physical addresses to fulfill a second set of requests. In some embodiments, the prefetch prediction engine can predict stride-lengths between successive memory access operations, and output can include a predicted stride-length. In some embodiments, processing logic can prefetch the second data from the first set of physical addresses and store the second data to a cache accessible by the host. In some embodiments, processing logic can receive the second set of requests to access the second data and provide the second data to the host. In some embodiments, the second set of requests can immediately follow the first set of requests. In some embodiments, the second set of requests can be separated from the first set of requests by one or more intermediate requests.

In some embodiments, the processing logic can receive a third set of requests to access third data stored at a second set of physical addresses. The processing logic can identify, using the physical address table (e.g., physical address table 138A or physical address table 138B), a second host identity (e.g., an identity of the host system 120B), and a second application identity (e.g., an identity of the application II 122) that correspond to the second set of physical addresses. The processing logic can provide the second set of requests, the second host identity, and the second application identity to the prefetch prediction engine. The processing logic can receive a second output from the prefetch prediction engine, the second output including a second memory address for prefetching fourth data from the second set of physical addresses to fulfill a fourth set of requests. In some embodiments the second output can include a second stride-length. In some embodiments, the second host identity can be the first host identity. That is, the first host can send the first set of requests and the third set of requests, the first set of requests pertaining to the first application, and the second set of requests pertaining to the second application. In some embodiments, the second application identity can be the first application identity. That is, the first application can send the first set of requests and the third set of requests.

In some embodiments, the third set of requests can be received before the first set of requests have been processed (e.g., before the processing logic finishes processing the first set of requests). In such embodiments, the first set of requests and the third set of requests can be processed simultaneously. The prefetch prediction engine (e.g., prefetch prediction engine 114 as described with respect to FIGS. 1A-B) can perform multiple predictions simultaneously. In some embodiments, the prefetch prediction engine can perform multiple interleaved predictions serially. For example, the prefetch prediction engine can perform a first prediction for a first set of requests, and then perform a second prediction for a second set of requests. The prefetch prediction engine might then perform a third prediction for the first set of requests to verify, or update the first prediction. The prefetch prediction engine might then perform a fourth prediction for the second set of requests, also to verify or update the second prediction.

In some embodiments, the physical address table can be a duplication of a portion of the virtual address table. The virtual address table can be maintained by a virtual address manager. The virtual address manager can be in the same computing environment of the memory sub-system, as described above with reference to FIG. 1A-B. In some embodiments, the virtual address manager can directly couple to the memory sub-system(s) (e.g., the virtual address manager can communicate with the memory sub-system(s)). In some embodiments, the virtual address manager can indicate to the host system how the host system can communicate with the memory sub-system(s), and the host system can directly communicate with the memory sub-system(s).

Figure 4:
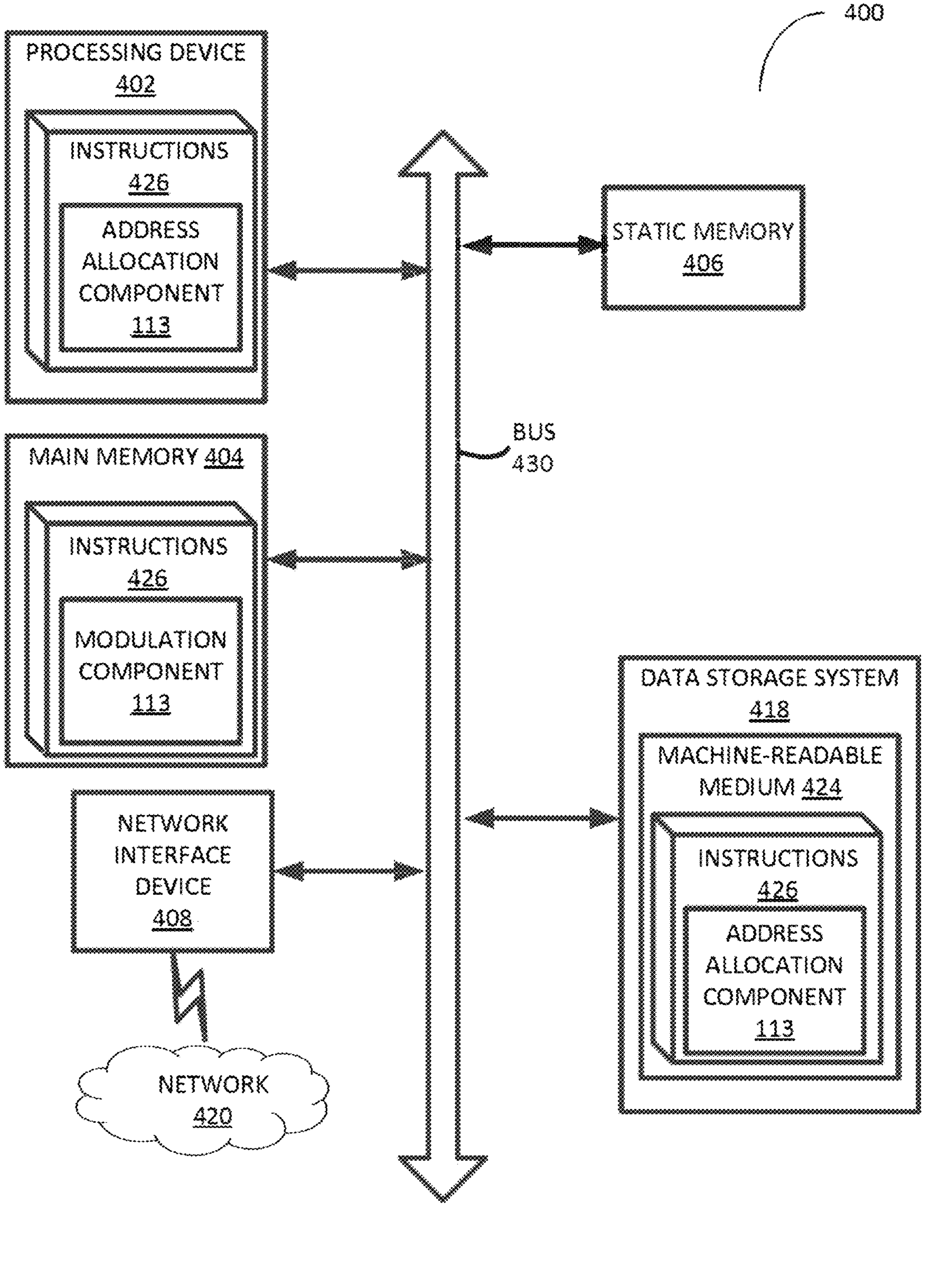
FIG. 4 is a block diagram of an example computer system in which embodiments of the disclosure may operate.

FIG. 4 illustrates an example of a computer system 400 within which a set of instructions, for causing the machine to perform any one or more of the methodologies discussed herein, can be executed. In some embodiments, the computer system 400 can correspond to a host system (e.g., the host system 120 of FIGS. 1A-B) that includes, is coupled to, or utilizes a memory sub-system (e.g., the memory sub-system 110 of FIGS. 1A-B) or can be used to perform the operations of a controller (e.g., to execute an operating system to perform operations corresponding to the prefetching component 113 of FIGS. 1A-B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIGS. 1A-B.

In one embodiment, the instructions 426 include instructions to implement functionality corresponding to the prefetching component 113 of FIGS. 1A-B). While the machine-readable storage medium 424 is illustrated in an example embodiment to be a single medium, the term "machine-readable storage medium" should be taken to include a single medium or multiple media that store the one or more sets of instructions. The term "machine-readable storage medium" shall also be taken to include any medium That is capable of storing or encoding a set of instructions for execution by the machine and that causes the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., a computer-readable non-transitory storage medium) having stored thereon instructions (e.g., executable instructions), which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:

a memory device indexed by a plurality of contiguous physical addresses, the plurality of contiguous physical addresses contiguously mapped to a portion of a plurality of contiguous virtual addresses;

a physical address table comprising information about (i) a host and (ii) an application assigned to respective sets of physical addresses of the plurality of contiguous physical addresses; and a processing device operatively coupled to the memory device, the processing device to perform operations comprising:

receiving a first set of requests to access first data stored at a first set of physical addresses;

identifying, using the physical address table, a first host identity, and a first application identity corresponding to the first set of physical addresses;

providing the first set of requests, the first host identity, and the first application identity to a prefetch prediction engine; and receiving an output of the prefetch prediction engine, the output comprising a first memory address for prefetching second data from the first set of physical addresses to fulfill a second set of requests.

2. The system of claim 1, the operations further comprising:

sending the first data to a first host identified by the first host identity.

3. The system of claim 2, the operations further comprising:

prefetching the second data from the first set of physical addresses; and storing the second data to a first cache accessible to the first host.

4. The system of claim 3, the operations further comprising:

receiving the second set of requests to access the second data; and providing the second data to the first host.

5. The system of claim 1, the operations further comprising:

receiving a third set of requests to access third data stored at a second set of physical addresses;

identifying, using the physical address table, a second host identity, and a second application identity corresponding to the second set of physical addresses;

providing the third set of requests, the second host identity, and the second application identity to the prefetch prediction engine; and receiving a second output of the prefetch prediction engine, the second output comprising a second memory address for prefetching fourth data from the second set of physical addresses to fulfill a fourth set of requests.

6. The system of claim 5, wherein the second host identity comprises the first host identity.

7. The system of claim 5, wherein the second application identity comprises the first application identity.

8. The system of claim 5, wherein the third set of requests are received before the processing device finishes processing the first set of requests, and wherein the processing device is to simultaneously process the first set of requests and the third set of requests.

9. The system of claim 1, wherein the physical address table is a duplication of a portion of virtual address table comprising the plurality of contiguous virtual addresses, wherein the virtual address table is maintained by a virtual address manager coupled to the memory sub-system.

10. A method comprising:

receiving, at a memory device, a first set of requests to access first data stored at a first set of physical addresses of a plurality of contiguous physical addresses of the memory device, the plurality of contiguous physical addresses contiguously mapped to a portion of a plurality of contiguous virtual addresses;

identifying, using a physical address table, a first host identity and a first application identity corresponding to the first set of physical addresses, wherein the physical address table comprises information about (i) a host and (ii) an application assigned to respective sets of physical addresses of the plurality of contiguous physical addresses;

providing the first set of requests, the first host identity, and the first application identity to a prefetch prediction engine; and receiving an output of the prefetch prediction engine, the output comprising a first memory address for prefetching second data from the first set of physical addresses to fulfill a second set of requests.

11. The method of claim 10, further comprising:

sending the first data to a first host identified by the first host identity.

12. The method of claim 11, further comprising:

prefetching the second data from the first set of physical addresses;

storing the second data to a first cache accessible to the first host; and responsive to receiving the second set of requests to access the second data, providing the second data to the first host.

13. The method of claim 10, further comprising:

receiving a third set of requests to access third data stored at a second set of physical addresses;

identifying, using the physical address table, a second host identity, and a second application identity corresponding to the second set of physical addresses;

providing the third set of requests, the second host identity, and the second application identity to the prefetch prediction engine; and receiving a second output of the prefetch prediction engine, the second output comprising a second memory address for prefetching fourth data from the second set of physical addresses to fulfill a fourth set of requests.

14. The method of claim 13, wherein the second host identity comprises the first host identity.

15. The method of claim 13, wherein the second application identity comprises the first application identity.

16. A computer-readable non-transitory storage medium comprising executable instructions that, when executed by a controller managing a memory device comprising a plurality of memory cells, cause the controller perform operations comprising:

receiving, at a memory device, a first set of requests to access first data stored at a first set of physical addresses of a plurality of contiguous physical addresses of the memory device, the plurality of contiguous physical addresses contiguously mapped to a portion of a plurality of contiguous virtual addresses;

identifying, using a physical address table, a first host identity and a first application identity corresponding to the first set of physical addresses, wherein the physical address table comprises information about (i) a host and (ii) an application assigned to respective sets of physical addresses of the plurality of contiguous physical addresses;

providing the first set of requests, the first host identity, and the first application identity to a prefetch prediction engine; and receiving an output of the prefetch prediction engine, the output comprising a first memory address for prefetching second data from the first set of physical addresses to fulfill a second set of requests.

17. The computer-readable non-transitory storage medium of claim 16, further comprising:

sending the first data to a first host identified by the first host identity.

18. The computer-readable non-transitory storage medium of claim 17, further comprising:

prefetching the second data from the first set of physical addresses;

storing the second data to a first cache accessible to the first host; and responsive to receiving the second set of requests to access the second data, providing the second data to the first host.

19. The computer-readable non-transitory storage medium of claim 16, further comprising:

receiving a third set of requests to access third data stored at a second set of physical addresses;

identifying, using the physical address table, a second host identity, and a second application identity corresponding to the second set of physical addresses;

providing the third set of requests, the second host identity, and the second application identity to the prefetch prediction engine; and receiving a second output of the prefetch prediction engine, the second output comprising a second memory address for prefetching fourth data from the second set of physical addresses to fulfill a fourth set of requests.

20. The computer-readable non-transitory storage medium of claim 19, wherein the third set of requests are received before the controller finishes processing the first set of requests, and wherein the controller is to simultaneously process the first set of requests and the third set of requests.

* * * * *